United States Patent
McIntyre et al.

(10) Patent No.: US 11,230,752 B2
(45) Date of Patent: Jan. 25, 2022

(54) HARD DISK DRIVE DISMANTLEMENT FOR CRITICAL MATERIAL RECOVERY

(71) Applicant: UT-Battelle, LLC, Oak Ridge, TN (US)

(72) Inventors: Timothy J. McIntyre, Oak Ridge, TN (US); Jonathan J. Harter, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 135 days.

(21) Appl. No.: 16/799,942

(22) Filed: Feb. 25, 2020

(65) Prior Publication Data
US 2020/0270725 A1     Aug. 27, 2020

Related U.S. Application Data

(60) Provisional application No. 62/809,797, filed on Feb. 25, 2019.

(51) Int. Cl.
*C22B 59/00* (2006.01)
*H01F 7/02* (2006.01)
(Continued)

(52) U.S. Cl.
CPC .............. *C22B 59/00* (2013.01); *G11B 5/127* (2013.01); *H01F 7/02* (2013.01); *G11B 5/02* (2013.01); *G11B 5/0245* (2013.01)

(58) Field of Classification Search
None
See application file for complete search history.

(56) References Cited

U.S. PATENT DOCUMENTS 7,054,824 B1   5/2006   Grenchus, Jr. et al.
7,534,980 B2   5/2009   Wilgen et al.
(Continued)

FOREIGN PATENT DOCUMENTS

| CN | 201259811 Y | 6/2009 |
| JP | 2012041575 A * | 3/2012 |
| WO | 2012/101398 A1 | 8/2012 |

OTHER PUBLICATIONS

Nemoto, Takeshi, et al. "Resource recycling for sustainable industrial development." Hitachi Review 60.6 (2011): 335.
(Continued)

*Primary Examiner* — William J Klimowicz
(74) *Attorney, Agent, or Firm* — Warner Norcross + Judd LLP

(57) ABSTRACT

A system and method for recycling rare earth materials from dissimilar hard disk drives are provided. The system and method generally include scanning each hard disk drive, sorting and aligning each hard disk drive, rapid fastener removal or diversion to a metrology station, and the collection of separated value streams, optionally for formation into new magnetic stock. For each scanned hard disk drive having a match in an inventory database, the method includes the separation of an internal magnet from residual components. For each scanned hard disk drive lacking a match in the inventory database, the method includes generating a metrology data collection record containing the location of each fastener on multiple surfaces of the corresponding hard disk drive. The system and method are commercially scalable with the potential to generate between 600 and 700 metric tons of rare earth elements from a single processing facility annually, including neodymium for example.

21 Claims, 4 Drawing Sheets

(51) Int. Cl.
*G11B 5/127* (2006.01)
*G11B 5/02* (2006.01)
*G11B 5/024* (2006.01)

(56) References Cited

U.S. PATENT DOCUMENTS

| | | | |
|---|---|---|---|
| 2011/0090585 A1 | 4/2011 | Schwarcz | |
| 2014/0366687 A1 | 12/2014 | Zakotnik et al. | |
| 2017/0297062 A1* | 10/2017 | Clark | C22B 59/00 |
| 2018/0236459 A1* | 8/2018 | Clark | B07C 5/3412 |
| 2018/0264559 A1* | 9/2018 | Clark | B23C 3/04 |
| 2020/0195101 A1* | 6/2020 | McIntyre | B65G 47/52 |
| 2020/0363790 A1* | 11/2020 | Harper | G06K 7/1417 |
| 2021/0213573 A1* | 7/2021 | Clark | G06F 21/80 |

OTHER PUBLICATIONS

"Smart Camera Integration in Machine Vision Systems," ThomasNet Jan. 24, 2012 [online], [retrieved Mar. 1, 2017]. URL: https://web.archive.org/web/20120124060248/http://www.thomasnet.com/articles/automation-electronics/smart-camera-machine-vision-system. (Year:2012).

Daniels, Design and Implementation of a Hall Effect Sensor Array Applied to Recycling Hard Drive Magnets, IEEE SoutheastCon 2015, Apr. 9-12, 2015 (Year: 2015).

PCT/US16/59970 International Search Report and Written Opinion dated Jan. 26, 2017.

* cited by examiner

HARD DISK DRIVE DISMANTLEMENT FOR CRITICAL MATERIAL RECOVERY

CROSS-REFERENCE TO RELATED APPLICATIONS

This application claims the benefit of U.S. Provisional Application 62/809,797, filed Feb. 25, 2019, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to a system and a method for the recovery of rare earth magnets from hard disk drives and other articles of manufacture.

BACKGROUND OF THE INVENTION

Demand for rare earth elements (REEs) is increasing worldwide and REEs are becoming more expensive and difficult to acquire. Many commonly used technologies rely on REEs. For example, computer hard disk drives, electric vehicles, and electronic communication devices, as well as clean energy, transportation, and national defense applications rely heavily on permanent magnets utilizing critical REEs. Material criticality can result from several factors. If a material is scarce geologically, it can be costly to mine. In addition, mining can also be costly due to environmental considerations. Most REEs are not scarce, although it is not economic to mine them but in a very few locations worldwide.

REEs include seventeen chemical elements, specifically fifteen lanthanides, scandium and yttrium. The lanthanide neodymium is classified as a critical material by the U.S. Department of Energy due to potential supply disruptions. A decrease in the availability of neodymium and other REEs puts future technological growth and national defense capabilities at risk. Until recently, other economic sources of these materials were not being developed.

Hard disk drives are a prime target for REE recovery, however. Hard disk drives contain small amounts of REEs individually but are accessible in large quantities as end-of-life products. The rare earth element neodymium, alloyed with iron and boron (NdFeB), is a powerful permanent magnet used in the read/write mechanism of hard disk drives. The magnetic material in a hard disk drive accounts for 2% to 3% of its total mass, but greater than 25% of a hard disk drive's value. Other REEs of interest are also contained in hard disk drives, namely dysprosium (Dy) and praseodymium (Pr). These two REEs are more valuable than Nd but are found in even smaller quantities than Nd. Nearly 7 billion hard disk drives have been manufactured to date and several hundred million more are manufactured annually. Hard disk drives in commercial data centers are typically replaced every 3 to 5 years to maintain ultra-high reliability data storage.

Despite the fact that hard disk drives contain valuable materials, they are typically shredded to ensure secure data destruction. Once shredded, hard disk drives are sold to metal scrap recyclers as mixed metal waste and the rare earth materials are lost. The sheer number of hard disk drives manufactured each year represents a significant portion of rare earth magnets available for recycling. High throughput, low cost systems for rare earth magnet recycling could supply a significant portion of the demand for rare earth materials in the United States. Accordingly, there remains a continued need for high throughput, cost-effective systems and methods for the recovery of rare earth elements from hard drives and other end-of-life devices.

SUMMARY OF THE INVENTION

A system and a method for recycling rare earth materials from multiple dissimilar hard disk drives are provided. The system and method generally include scanning each hard disk drive into an inventory database, sorting and aligning each hard disk drive, rapid fastener removal or diversion to a metrology station, and the collection of separated value streams, optionally for formation into new magnetic stock, or for resale as commodities or direct reuse as an intact subassembly (e.g. voice coil magnet assembly (VCMA)). The system and method are commercially scalable and are estimated to have the potential to generate from a single processing facility between 600 and 700 metric tons of rare earth elements annually from hard disk drives alone, including neodymium for example.

In one embodiment, a method for recovering rare earth permanent magnets from a plurality of hard disk drives includes aligning each of the hard drives along a primary conveyor path and scanning an identifier associated with each of the plurality of hard disk drives. The method further includes comparing each scanned identifier with identifiers stored to an inventory database. For each scanned identifier having a match in the inventory database, the method includes performing an automated disassembly routine, including the separation of an internal magnet assembly, or magnets, from residual components of the corresponding hard disk drive. For each scanned identifier lacking a match in the inventory database, the method includes generating a metrology data collection record containing the location for each of a plurality of fasteners on multiple surfaces of the corresponding hard disk drive (e.g. a fastener map).

In another embodiment, a system for recovering rare earth materials from multiple dissimilar hard disk drives is provided. The system includes an alignment station, an identification and sorting station, a central controller having access to an inventory database, disassembly stations, and a metrology station. The alignment station is operable to align each of the dissimilar hard drives along a primary conveyor path and the identification and sorting station is operable to scan an identifier associated with each of the dissimilar hard disk drives. The central controller then determines, for each hard disk drive, whether a disassembly routine is available based on the output of the identification and sorting station. Each disassembly station includes one or more disassembly robots for fastener removal and hard disk drive disassembly according to an associated disassembly routine accessible to the central controller. The metrology station, by contrast, is adapted to receive the remaining hard disk drives and generate a metrology data collection record, or fastener map, containing the location for each of a plurality of fasteners on multiple surfaces of the corresponding hard disk drive.

The system and method can be readily adapted for the removal of rare earth magnets from a variety of articles of manufacture, including hard disk drives. It can also rapidly process solid state drives, as they are gradually displacing spinning disk HDDs. Solid state drives (SSDs) do not contain Nd, Dy and Pr but they do contain valuable memory chips and other value streams. The system and method are scalable into an automated continuous process. The reclaimed rare earth materials can be further processed into constituent elements before being recombined for new purposes to address the increasing demand for rare earth materials in consumer electronics and other applications.

These and other features and advantages of the present invention will become apparent from the following description of the invention, when viewed in accordance with the accompanying drawings and appended claims.

DETAILED DESCRIPTION OF THE CURRENT EMBODIMENTS

The current embodiments include a system and a method for recovering rare earth element (REE) permanent magnets from hard disk drives (HDD) and other end-of-life products. In one embodiment, the system and the method include scanning each HDD into an inventory database, sorting and aligning each HDD, rapid fastener removal or diversion to a metrology station, and the collection of separated value streams, with the order of each step being variable. The HDDs can each have one REE permanent magnet in some embodiments, while in other embodiments the HDDs can each have two or more REE permanent magnets. While described in connection with HDDs, the current embodiments can be used with other end-of-life products.

Scanning each HDD into an inventory database generally includes operating an automated identification unit to populate a registry in computer readable memory with identifying information for each HDD in a mixed product stream. As used herein, a "mixed product stream" means a continuous or discontinuous run of two or more different articles, for example different models of HDDs. In one embodiment, a HDD receiving station 10 is operable to perform the automated identification of a shipping container containing a plurality of dissimilar end-of-life HDDs. The automated identification can include a contactless scan of a computer readable identifier, for example a bar code, a quick response (QR) code, a radio frequency identification (RFID) tag, or a near field communication (NFC) tag. A first automated identification unit 12 provides a corresponding batch number to the central controller 14, which then updates the inventory database 16. The HDDs are subsequently removed from the shipping container and at some future time individually scanned for updating the inventory database.

Figure 4:
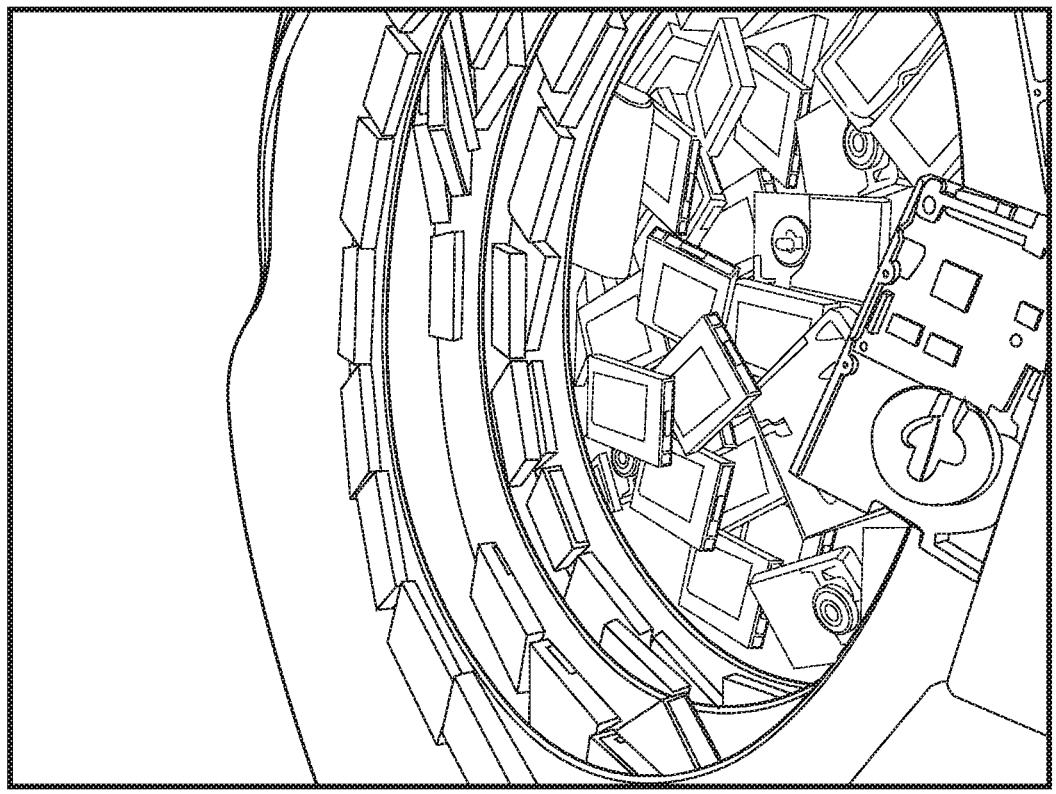
FIG. 4 illustrates a vibratory bowl feeder for aligning end-of-life hard disk drives for placement on a conveyor system for automated disassembly.

An alignment station 18 then acts to position each HDD for identification and maximum value recovery. For example, an elevating conveyor feeds the HDDs into a vibratory bowl feeder 20, shown in FIG. 4. The vibratory bowl feeder 20 is engineered to circulate the HDDs through a series of static mechanical articulations that align the HDDs. These articulations flip and rotate the HDDs as needed for the desired alignment outcome. If an HDD is not properly aligned, it is returned automatically to the bottom of the vibratory bowl feeder 20 for reprocessing.

Upon exiting the alignment station 18, the HDDs are scanned in a first-in first-out sequence (FIFO) in an identification and sorting station 22 by a second automated identification unit 24. The second automated identification unit (or inventory scanner) 24 is adapted to determine the model of each HDD from the plurality of HDDs, sufficient to allow the central controller 14 to determine whether a HDD is recognized (having a corresponding disassembly routine) or unrecognized (lacking a corresponding disassembly routine). As with the first automated identification unit 12, the second automated identification unit 24 is adapted to scan a barcode, a QR code, an RFID tab, or an NFC tag, by non-limiting example. Based on the output of the second automated identification unit 24, the central controller 14 then updates the inventory database 16 to include an identifier, timestamp, and location 50 for each such HDD. The second automated identification unit 24 optionally works in concert with an HDD tracking sensor 26, for example an LED emitter and detector pair. In one example, the detector outputs a signal in response to the occlusion of LED light by a passing HDD. The central controller 14 then determines the approximate time each HDD passes by the HDD tracking sensor 26 and initiates a scan of the HDD using the second automated identification unit 24. Using this information, the central controller 14 populates the inventory database 16 for each HDD in the mixed product stream.

As noted above, the second automated identification unit 24 collects inventory data from each HDD. The inventory data is used by the central controller 14 to determine if the inventory data matches an existing record, i.e., is recognized. If the inventory data matches an existing record, the corresponding HDD is routed, by the identification and sorting station 22, to a series of disassembly stations 30 having an indexing conveyor 34. If the inventory data does not match an existing record, the corresponding HDD is instead routed, by the identification and sorting station 22, to a metrology station 40. In one embodiment, the identification and sorting station 22 includes diverters for routing an unrecognized HDD to a side conveyor that leads to the metrology station 40. The diverters can include any device adapted to cause an unrecognized HDD to enter the designated side conveyor, for example a flipper mechanism or an electromagnet. In another embodiment, the identification and sorting station 22 includes diverters for routing a recognized HDD to a side conveyor to the disassembly station(s) 30.

While at the metrology station 40, a third automated identification unit 42 scans each entering HDD and the central controller 14 creates a new metrology data collection record in the inventory database 16 for each unrecognized HDD. A data collection record 50 is then populated with the precise coordinates for the corresponding fastener location on the particular model HDD. This operation is optionally performed using a metrology arm 44, for example an articulating arm coordinate measuring machine (CMM) by FARO Technologies, Inc. The metrology arm 44 generates positioning signals that are indicative of the location of each fastener on each major surface of the unrecognized HDD. The fasteners are then removed, and the process is repeated for internal fasteners. The metrology data collection record, when completed, includes position data for fasteners on the top, inside the HDD with the top (lid) removed (upper magnet assembly), the printed circuit board on the bottom, the lower magnet assembly after the PCB is removed, the voice coil pivot bearing, and the spindle motor. The position data can also include the corresponding fastener type (e.g., Phillips, hex, torx, etc.).

While at the disassembly (or dismantlement) station 30, the recognized HDDs are disassembled by removing each fastener in each field of view (FOV) according to a unique robotic disassembly routine. This operation is performed by one or more disassembly robots 32 according to instructions for the specific model of HDD. In other words, the disassembly robots 32 conduct automated disassembly operations consistent with a disassembly routine stored to computer readable memory. The indexing conveyor 34 is configured to repeatedly capture HDDs and place them precisely into individual machining stations. The disassembly robots 32 are adapted to remove different fasteners, or different fastener types (e.g., screws v. rivets) without a tool change. In particular, the disassembly robots 32, with knowledge of a fastener map, can remove each fastener by rapid superheating of the tool-fastener interface or the disassembly robot's end effector and plunging the end effector into the fastener. This technique is used to remove flat, Phillips, Torx, rivets, etc. without requiring a shape match. In other embodiments, the disassembly robots 32 uses an end effector matching the predominant fastener head, e.g., a Philips or Torx end effector, particular if all or most fasteners are of the same kind. As fastener removal tasks are completed, the indexing conveyor advances, or indexes each recognized HDD by one increment for additional processing. While at the fastener removal stations, the disassembly routine generally includes removal of the top lid, which can reveal additional fasteners of interest, for example the upper magnet assembly and a voice coil pivot. Once the top lid is removed and upper magnet assemble fasteners are also removed, the HDD is optionally flipped to a second FOV and the underside PCB is removed. Once the underside PCB is removed, lower magnet assemble fasteners are removed allowing the lower magnet assembly to be removed and collected. Also, while at the fastener removal station, a component collection robot performs the task of pulling the aforementioned HDD lid free from the body of the HDD after the fasteners are removed. Subsequently, a similar operation is performed to collect the upper magnet assembly. Fastener removal and component collection can be done within the fastener removal station, or across multiple stations. Other HDD manipulation tasks optionally include flipping over the HDD for recovery operations on the underside, collecting the PCB and lower magnet assembly.

Figure 1:
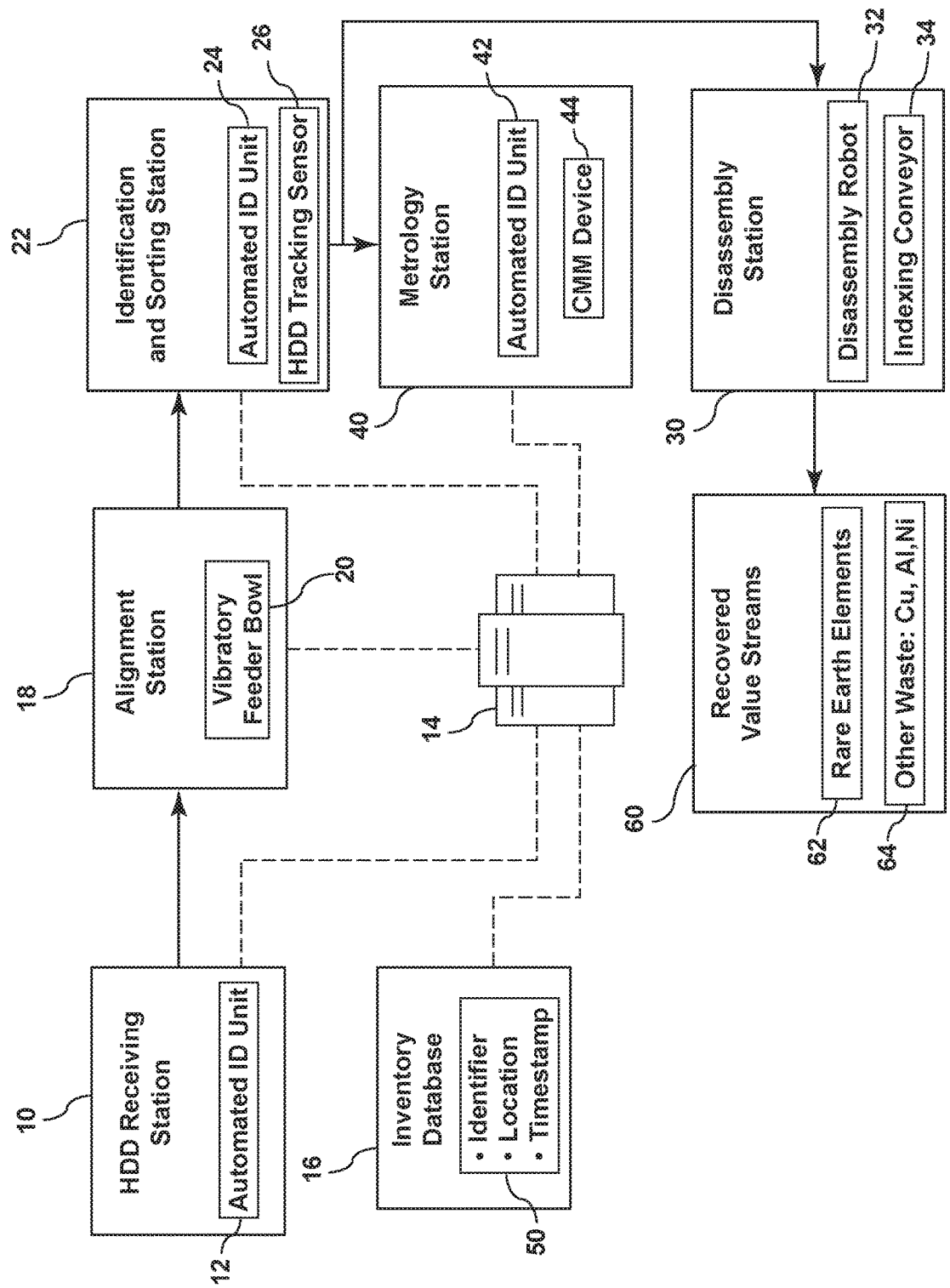
FIG. 1 is a schematic view of a system for recovering value streams like rare earth element permanent magnets and a multitude of other streams (aluminum, permalloy, printed circuit boards, etc.) from end-of-life hard disk drives.

Each separated and recovered component is sorted and represents a recovery value stream 60 of rare earth elements 62 and non-critical elements/components 64, shown in FIG. 1, having greater value than mixed waste created by shredding. Collection of non-critical (e.g., non-rare earth element) constituents 64 such as copper, nickel, aluminum, steel, and various metals enhances the value associated with REE recovery operations. Sorting of the recovered components can result in at least the following value streams: steel, aluminum, PCBs, and magnet assemblies. Further separation of recovered components can be performed, liberating copper, permalloy, mu-metal, and data platters for potential reuse. The spindle motor and the voice coil pivot bearing are further potential recovery streams that could represent an opportunity for direct reuse in new HDDs.

Figure 2:
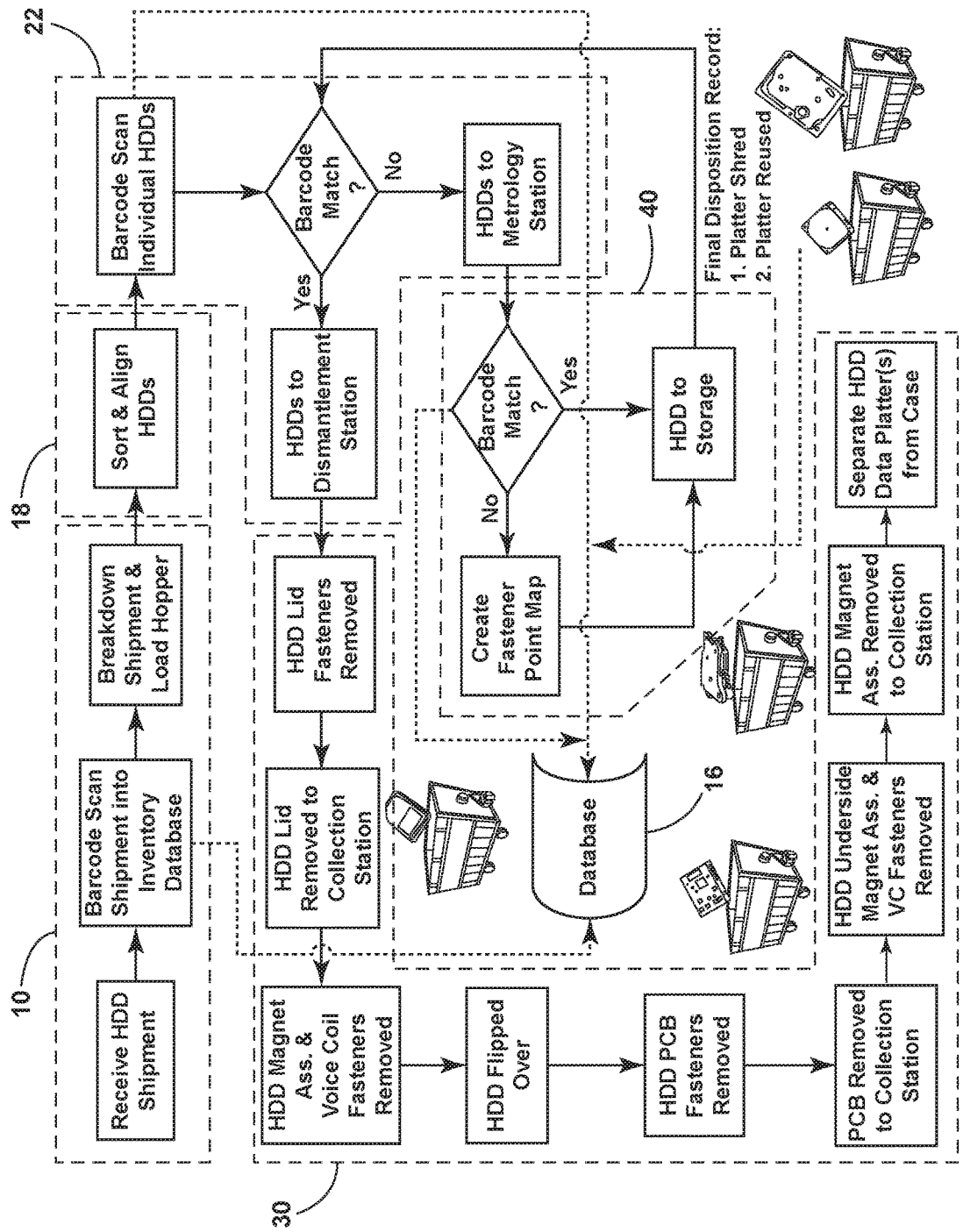
FIG. 2 is a flow-chart for a system for recovering value streams including, but not limited to, rare earth element permanent magnets from end-of-life hard disk drives.
Figure 3:
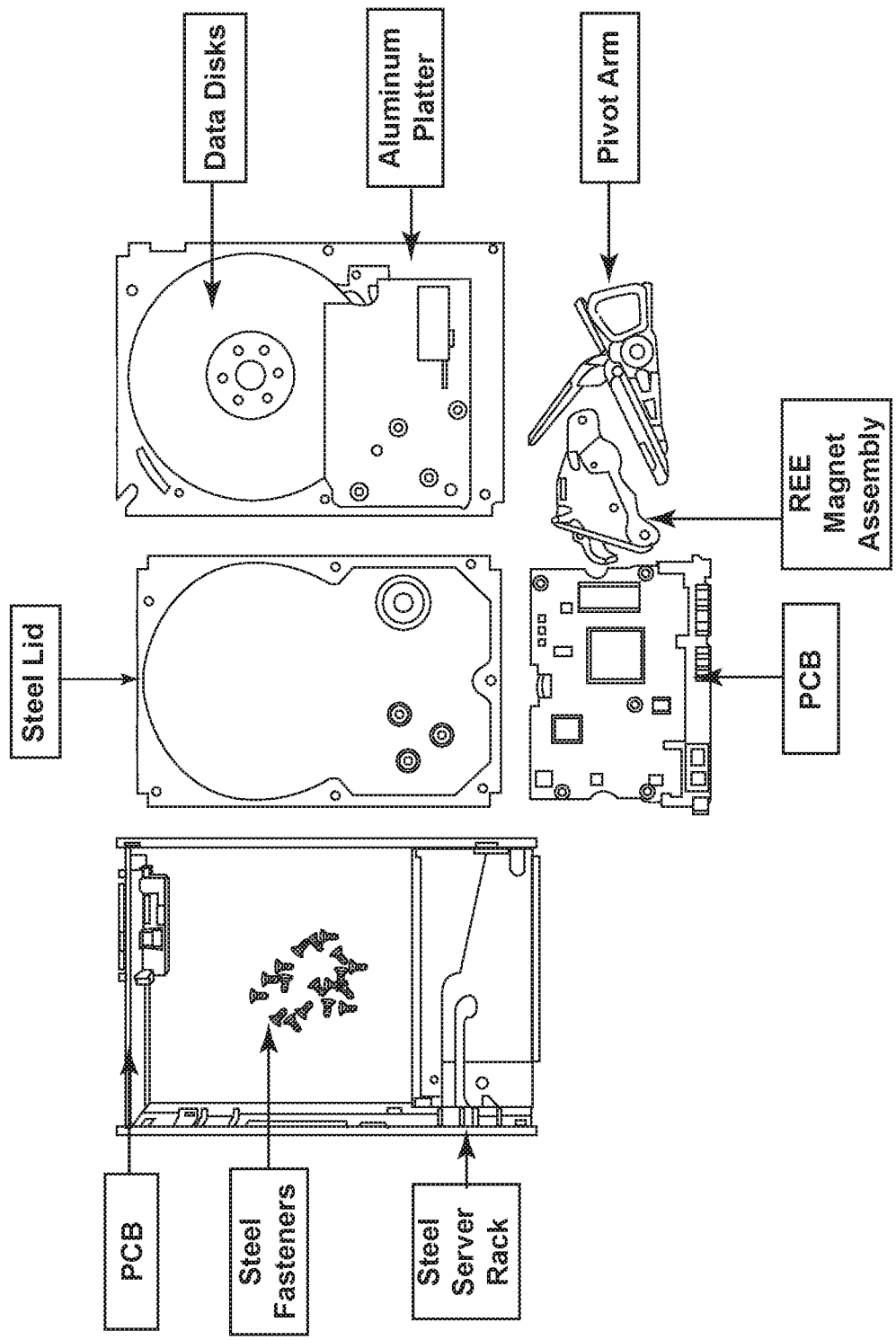
FIG. 3 illustrates a disassembled hard disk drive for various value streams of rare earth element materials and non-rare earth element materials.

A further embodiment of the foregoing system and method is illustrated in the flow-chart of FIG. 2. In this embodiment, bulk HDDs are received and scanned into an inventory database at the HDD receiving station 10. The HDD receiving station 10 performs the automated identification of a shipping container containing dissimilar end-of-life HDDs. The HDDs are subsequently loaded into a hopper and fed into a vibratory bowl feeder 20. The vibratory bowl feeder 20 circulates the HDDs through a series of static mechanical articulations that align the HDDs. These articulations flip and rotate the HDDs as needed for the desired alignment outcome. The HDDs are then output to an identification and sorting station 22 to determine whether a HDD is recognized (having a corresponding disassembly routine) or unrecognized (lacking a corresponding disassembly routine). Recognized HDDs are transported (or diverted) to a disassembly station 30 for the removal of fasteners and the disassembly of each HDD according to a unique robotic disassembly routine. The disassembly routine includes the removal of fasteners, the removal of the top lid, the upper magnet assembly, the voice coil actuator, the PCB, the lower magnet assembly and separation of HDD data platter/spindle motor assembly from the aluminum case. The removal of fasteners is achieved without a tool change. In particular, the disassembly robots, with knowledge of a fastener map, remove each fastener by rapid superheating of the tool-fastener interface or the disassembly robot's end effector and plunging the end effector into the fastener. Unrecognized HDDs are diverted (or transported) to a metrology station 40 for the creation of a new metrology data collection record for a given model HDD. As noted above, this operation is performed using a metrology arm 44, which generates positioning signals that are indicative of the location of each fastener on each major surface of the unrecognized HDD. The metrology data collection record, when completed, includes position data for fasteners on the top lid, upper magnet assembly with the top lid removed, the voice coil pivot bearing, the underside PCB, and the lower magnet assembly with the PCB removed, such that future HDDs of the same model are recognized at the identification and sorting station 22 and for which the central controller 14 has access to an appropriate disassembly routine. As shown in FIG. 3, each disassembled HDD leaves the disassembly station 30 after having been separated into the following sub-components: REE magnet assembly, lid, data platters and spindle motor, aluminum case, voice coil pivot actuator, PCB, steel fasteners, and steel server rack (if necessary). Further separation of the recovered components is optionally performed to liberate copper, permalloy, mu-metal, and data platters for potential direct reuse.

A related method of operation includes: scanning each HDD into an inventory database, sorting and aligning each HDD, rapid fastener removal or diversion to a metrology station, and the collection of separated value streams. The foregoing method can be performed in conjunction with the system and flow-chart of FIGS. 1-2 and can be modified to include greater or fewer method steps in other embodiments as desired. The related method is well adapted to maximum value recovery, creating a new supply of REEs (for example neodymium, praseodymium, and dysprosium), and enabling a circular economy by making HDD components and sub-assemblies available for direct reuse in new HDDs or elsewhere. The related method is scalable into an automated continuous process for reclaiming rare earth materials, which can be further processed into constituent elements before being recombined for new purposes to address the increasing demand for rare earth materials in consumer electronics and other devices.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements by ordinal terms, for example "first," "second," and "third," are used for clarity, and are not to be construed as limiting the order in which the claim elements appear. Any reference to claim elements in the singular, for example, using the articles "a," "an," "the" or "said," is not to be construed as limiting the element to the singular.

The invention claimed is:

1. A method for recovering rare earth permanent magnets from a plurality of hard disk drives, the method comprising:
   aligning each of the plurality of hard disk drives along a primary conveyor path, the plurality of hard disk drives including at least two dissimilar hard disk drives;
   scanning an identifier associated with each of the plurality of hard disk drives and comparing each scanned identifier with identifiers stored to an inventory database;
   for each scanned identifier having a match in the inventory database, performing an automated disassembly routine, the automated disassembly routine including the separation of an internal magnet from residual components of the corresponding hard disk drive; and
   for each scanned identifier lacking a match in the inventory database, generating a metrology data collection record, the metrology data collection record including a location for each of a plurality of fasteners on multiple surfaces of the corresponding hard disk drive.

2. The method of claim 1 wherein aligning each of the plurality of hard disk drives along the primary conveyor path is performed using a vibratory bowl feeder.

3. The method of claim 1 wherein scanning the identifier includes reading a bar code, a quick response code, a radio frequency identification tag, or a near field communication tag.

4. The method of claim 1 wherein performing the automated disassembly routine includes heating an end effector and plunging the end effector into the location of each of the plurality of fasteners, the plurality of fasteners including dissimilar fastener heads.

5. The method of claim 1 wherein generating the metrology data collection record is performed with an articulating arm coordinate measuring machine.

6. The method of claim 1 wherein the inventory database is stored to computer readable memory and includes an inventory record for each of the plurality of hard disk drives.

7. A system for recovering rare earth materials from a plurality of dissimilar hard disk drives, the system comprising:
   an alignment station operable to position each of a plurality of dissimilar hard disk drives into a predetermined orientation, the alignment station including a vibratory bowl feeder;
   an identification and sorting station including an automated identification unit operable to scan an identifier associated with each of the plurality of dissimilar hard disk drives;
   a central controller having access to an inventory database, the central controller being operable to determine, for each of the plurality of dissimilar hard disk drives, whether a disassembly routine is available based on the output of the automated identification unit;
   a disassembly station operable to receive a first portion of the plurality of dissimilar hard disk drives from the identification and sorting station and including one or more disassembly robots adapted for fastener removal and hard disk drive disassembly according to an associated disassembly routine accessible to the central controller; and
   a metrology station adapted to receive a second portion of the plurality of dissimilar hard disk drives from the identification and sorting station for which a predetermined disassembly routine is not available to the central controller.

8. The system of claim 7 wherein the disassembly station is operable to separate magnet assemblies from residual subcomponents of the plurality of dissimilar hard disk drives.

9. The system of claim 7 wherein the associated disassembly routine includes computer readable instructions that are executable by the one or more disassembly robots based on a metrology data collection record.

10. The system of claim 9 wherein the metrology data collection record is developed at the metrology station and includes fastener coordinates for multiple fields of view.

11. The system of claim 7 wherein the metrology station includes an articulating arm coordinate measuring machine.

12. The system of claim 7 wherein the inventory database includes identifiers for each of the first portion of the plurality of dissimilar hard disk drives.

13. The system of claim 7 wherein the automated identification unit is adapted to read a bar code, a quick response code, or a radio frequency identification tag.

14. The system of claim 7 further including a hard disk drive receiving station including a further automated identification unit operable to scan an identifier associated with a bulk container containing the plurality of dissimilar hard disk drives.

15. The system of claim 7 wherein the associated disassembly routine is a first associated disassembly routine, further including a second associated disassembly routine.

16. The system of claim 7 wherein the disassembly station includes an indexing conveyor to transport the first portion of the plurality of dissimilar hard disk drives to each of the one or more disassembly robots.

17. A method for recovering rare earth permanent magnets from a plurality of hard disk drives, the method comprising:

positioning each of the plurality of hard disk drives along a primary conveyor path, the plurality of hard disk drives including at least two dissimilar hard disk drives;

scanning an identifier associated with each of the plurality of hard disk drives and comparing each scanned identifier with identifiers stored to an inventory database;

diverting a first portion of the plurality of hard disk drives to a disassembly station for fastener removal and hard disk drive disassembly according to a disassembly routine; and diverting a second portion of the plurality of hard disk drives to a metrology station for generating a metrology data collection record containing a location for each of a plurality of fasteners on multiple surfaces of the corresponding hard disk drive.

18. The method of claim 17 wherein scanning the identifier includes reading a bar code, a quick response code, a radio frequency identification tag, or a near field communication tag.

19. The method of claim 17 wherein performing the disassembly routine includes heating an end effector and plunging the end effector into the location of each of the plurality of fasteners, the plurality of fasteners including dissimilar fastener heads.

20. The method of claim 17 further including determining at the metrology station if the plurality of fasteners on the corresponding hard disk drive are of a common type and subsequently removing each of the plurality of fasteners with a corresponding end tool.

21. The method of claim 17 wherein generating the metrology data collection record is performed with an articulating arm coordinate measuring machine.

\* \* \* \* \*